United States Patent
Su et al.

(10) Patent No.: US 8,850,233 B2
(45) Date of Patent: Sep. 30, 2014

(54) MULTI-PHASE VOLTAGE REGULATOR MODULE SYSTEM

(75) Inventors: Sheng-Chieh Su, Taipei (TW); Jung-Tai Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 712 days.

(21) Appl. No.: 12/652,072

(22) Filed: Jan. 5, 2010

(65) Prior Publication Data
US 2010/0191986 A1  Jul. 29, 2010

(30) Foreign Application Priority Data
Jan. 23, 2009 (TW) ................ 98102962 A

(51) Int. Cl.
*G06F 1/26* (2006.01)
*G06F 1/30* (2006.01)
*H02M 3/158* (2006.01)

(52) U.S. Cl.
CPC ............... *G06F 1/26* (2013.01); *H02M 3/1584* (2013.01)
USPC ........... 713/300; 713/320; 713/322; 713/323; 361/83; 361/89; 361/195

(58) Field of Classification Search
USPC .............. 713/300, 320, 322, 323; 361/83, 89, 361/195
See application file for complete search history.

(56) References Cited

U.S. PATENT DOCUMENTS

| | | | |
|---|---|---|---|
| 6,194,879 B1* | 2/2001 | Carraro | 322/59 |
| 7,342,383 B1 | 3/2008 | Song et al. | |
| 7,615,982 B1* | 11/2009 | Guo | 323/285 |
| 2002/0070799 A1* | 6/2002 | Dahan et al. | 330/10 |
| 2007/0013350 A1 | 1/2007 | Tang et al. | |
| 2007/0234078 A1 | 10/2007 | Nguyen | |
| 2008/0238390 A1 | 10/2008 | Trivedi et al. | |
| 2009/0295357 A1 | 12/2009 | Lin et al. | |
| 2009/0307509 A1* | 12/2009 | Jenne | 713/322 |

FOREIGN PATENT DOCUMENTS

TW  200845535  11/2008

* cited by examiner

*Primary Examiner* — Michael J Brown
(74) *Attorney, Agent, or Firm* — Jianq Chyun IP Office

(57) ABSTRACT

A multi-phase voltage regulator module system includes a VRM and a phase control circuit. The VRM is capable of outputting a load detecting voltage which is direct proportion to the load of the CPU. The phase control circuit outputs a first level phase switching signal to the VRM, and a core voltage outputted by the VRM to the CPU is changed from N phases to M phases when the load detecting voltage increases to a first voltage. The phase control circuit a second level phase switching signal to the VRM, and the core voltage outputted by the VRM to the CPU from M phases to N phases when the load detecting voltage decreases to a second voltage. The first voltage is higher than the second voltage. M is larger than N.

7 Claims, 3 Drawing Sheets

MULTI-PHASE VOLTAGE REGULATOR MODULE SYSTEM

FIELD OF THE INVENTION

The invention relates to a multi-phase voltage regulator module system and, more particularly, to a multi-phase voltage regulator module system which can switch between different phases according to the increment or decrement of the load.

BACKGROUND OF THE INVENTION

Generally speaking, the power source of a central processing unit (CPU) in a computer system is not provided by a power supply directly. The main reason is that the core voltage (Vcore) needed by the CPU varies according to the value of a load. Since the core voltage (Vcore) may be increased or decreased instantaneously, the power supply cannot respond to the sudden change immediately. To solve the problem, a voltage regulator module (VRM) which specially provides power to the CPU is provided on the motherboard.

FIG. 1 is a schematic diagram showing a conventional single-phase VRM of a motherboard. The single-phase VRM 10 includes a pulse width modulate (PWM) control unit 102, a PWM driver 104, and an output unit 106. The PWM control unit 102 can output a PWM signal to the PWM driver 104.

Additionally, the PWM driver 104 includes a steering logic circuit 1042 and two driving circuits 1044 and 1046. The steering logic circuit 1042 generates a first signal and a second signal according to the PWM signal. The two driving circuits 1044 and 1046 generate a first driving signal S1 and a second driving signal S2 after receiving the first signal and the second signal, respectively.

Furthermore, the output unit 106 includes an upper power field effect transistor (FET) M1, a lower power FET M2, an output inductor L, a current sense resistor Rs, and an output capacitor Co. The drain electrode of the upper power FET M1 is connected to a power source voltage Vcc. The gate electrode of the upper power FET M1 receives the first driving signal S1. The source electrode of the upper power FET M1 is connected to a first end of the output inductor L. The drain electrode of the lower power FET M2 is connected to the first end of the output inductor L. The gate electrode of the lower power FET M2 receives the second driving signal S2. The source electrode of the lower power FET M2 is connected to ground (GND). The current sense resistor Rs is connected between a second end of the output inductor L and a core voltage output end Vcore. The output capacitor Co is connected to the core voltage output end Vcore and the GND.

Driven by the first driving signal S1 and the second driving signal S2, the output inductor L and the current sense resistor Rs generate output current Io to the core voltage output end Vcore. It can be known that whether the CPU operates at a heavy load or a light load according to the output current Io. When the CPU is detected to be at heavy load by detecting a sense voltage Vs across the current sense resistor Rs, the PWM control unit 102 may increase the pulse width of the PWM signal to increase the output current Io. Conversely, when the CPU is detected to be at light load by detecting a sense voltage Vs across the current sense resistor Rs, the PWM control unit 102 decreases the pulse width of the PWM signal to decrease the output current Io.

The more phases the VRM has, the more PWM drivers 104 and the output units 106 the VRM includes. Conventionally, a motherboard always uses the multi-phase VRM (multi-phase VRM). The multi-phase VRM can provide enough core voltages to a CPU when the CPU is at the heavy load.

FIG. 2 is a schematic diagram showing that a conventional four-phase VRM on a motherboard supplies power to a CPU. The four-phase VRM 20 includes a PWM control unit 202, four PWM drivers 204, 206, 208 and 210, and four output units 212, 214, 216 and 218.

The PWM control unit 202 can output four-phase pulse signals (PWM1 signal, PWM2 signal, PWM3 signal, PWM4 signal) to the PWM drivers 204, 206, 208 and 210, respectively. The output unit 212 cooperated with the PWM driver 204 outputs a core voltage Vcore-1 having a first phase. The output unit 214 cooperated with the PWM driver 206 outputs a core voltage Vcore-2 having a second phase. The output unit 216 cooperated with the PWM driver 208 outputs a core voltage Vcore-3 having a third phase. The output unit 218 cooperated with the PWM driver 210 outputs a core voltage Vcore-4 having a fourth phase. Consequently, the core voltage Vcore needed by a CPU 22 is provided by the four-phase VRM 20 according to the PWM1 signal, the PWM2 signal, the PWM3 signal, and the PWM4 signal. Since the circuits of the four PWM drivers 204, 206, 208, and 210 are the same as the circuit of the PWM driver 104 in FIG. 1, and the four output units 212, 214, 216, and 218 are the same as the circuit of the output unit 106 in FIG. 1, the operating principle thereof are not described for a concise purpose.

The stability of the CPU is improved along with the increase of the number of phases of the VRM, but companies have to consider the efficiency of the VRM. The more phases the VRM has, the more energy are consumed. Furthermore, there is a problem that the efficiency of the VRM is low at the light load. The CPU 22 transmits a power state indicator (PSI) signal when the CPU 22 operates at a load lower than the lowest load, and the motherboard requires the four-phase VRM 20 to only enable a single phase to supply power to the CPU 22. For example, Only the core voltage Vcore-1 having the first phase outputted by the output unit 212 cooperating with the PWM driver 204 supplies power to the CPU 22 to realize the optimization of the efficiency of the VRM. However, conventional VRMs can only switch between the four-phase power supply and the single-phase power supply (taking the four phase VRM as an example). People focus on energy saving today, and it wastes energy.

SUMMARY OF THE INVENTION

The invention provides a multi-phase VRM system used in a CPU. The multi-phase VRM system includes a VRM, and a phase control circuit. The VRM is connected to the CPU. The VRM outputs a load detecting voltage, and the load detecting voltage is in direct proportion to an actual load of the CPU. The phase control circuit is connected to the VRM. The phase control circuit outputs a first level phase switching signal to the VRM when the load detecting voltage increases to a first voltage, and the phase control circuit outputs a second level phase switching signal to the VRM when the load detecting voltage decreases to a second voltage. A core voltage outputted by the VRM to the CPU is changed from N phases to M phases after the VRM receives the first level phase switching signal. The core voltage outputted by the VRM to the CPU is changed from M phases to N phases after the VRM receives the second level phase switching signal. The first voltage is higher than the second voltage. M is larger than N.

A method of providing a core voltage to a CPU is used in a VRM. The method includes the following steps. An actual load of the CPU is detected. The core voltage outputted by the VRM to the CPU is changed from N phases to M phases when the actual load of the CPU increases to a first load value, and the core voltage outputted by the VRM to the CPU is changed from M phases to N phases when the actual load of the CPU decreases to a second load value. M is larger than N. The first load value is larger than the second load value.

The multi-phase VRM system can provide the core voltage having different phases to the CPU according to the load of the CPU, so the efficiency of the VRM can be improved greatly.

DETAILED DESCRIPTION OF THE PREFERRED EMBODIMENT

Figure 1:
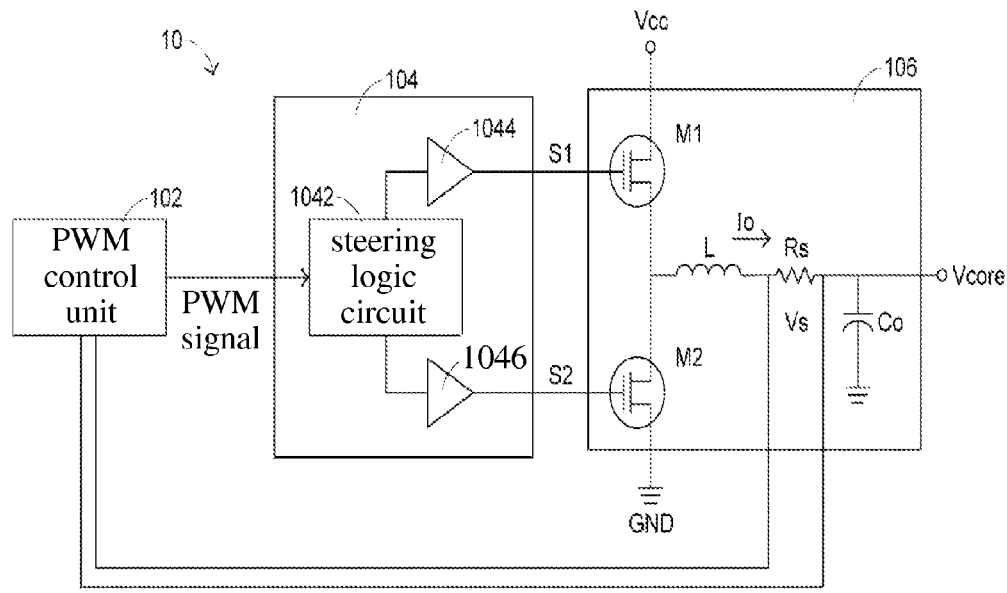
FIG. 1 is a schematic diagram showing a conventional single-phase VRM on a motherboard.
Figure 2:
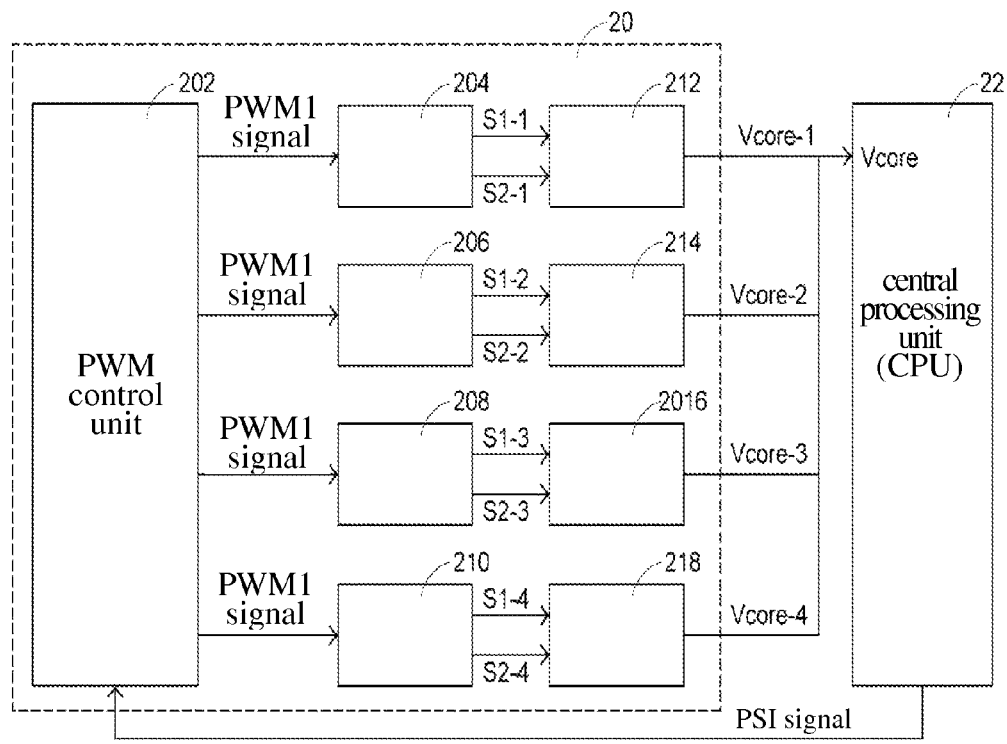
FIG. 2 is a schematic diagram showing that a conventional four-phase VRM on a motherboard supplies power to a CPU.
Figure 3:
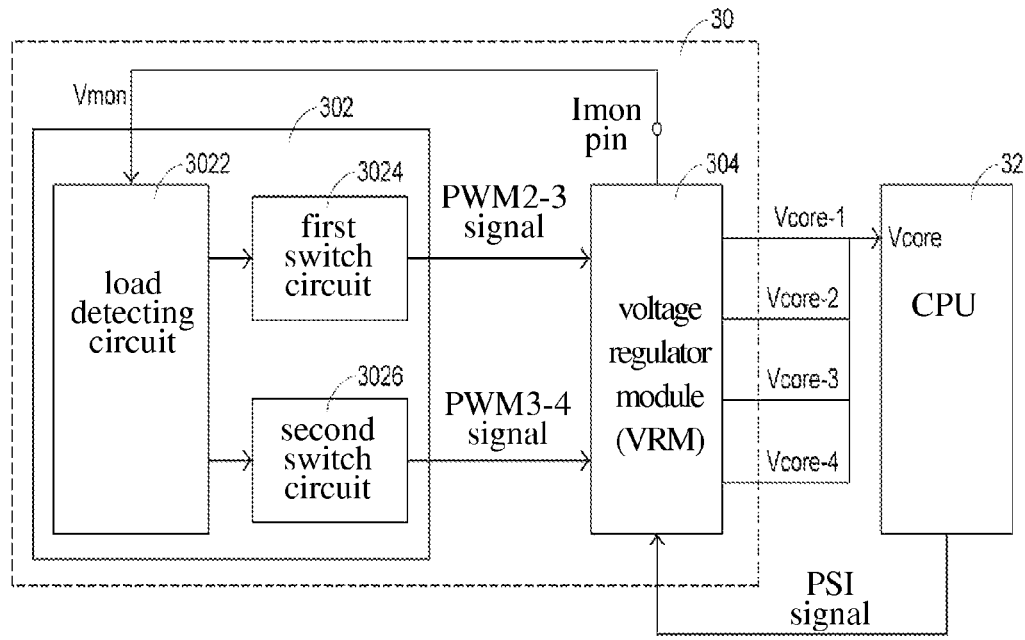
FIG. 3 is a block diagram showing that a multi-phase VRM system supplies power to a CPU according to an embodiment of the invention.

FIG. 3 is a block diagram showing that a multi-phase VRM system supplies power to a CPU according to an embodiment of the invention (taking a four-phase VRM system as an example). The multi-phase VRM system 30 includes a phase control circuit 302 and a VRM 304. The phase control circuit 302 further includes a load detecting circuit 3022, a first switch circuit 3024, and a second switch circuit 3026. The first switch circuit 3024 can output a two-three phase switching signal (PWM2-3 signal) to the VRM 304 according to the driving of the load detecting circuit 3022. The second switch circuit 3026 can output a three-four phase switching signal (PWM3-4 signal) to the VRM 304 according to the driving of the load detecting circuit 3022. The VRM 304 can output a core voltage Vcore-1 having a first phase, a core voltage Vcore-2 having a second phase, a core voltage Vcore-3 having a third phase, and a core voltage Vcore-4 having a fourth phase to the CPU 32.

The CPU 32 transmits a PSI signal to the VRM 304 when the load of the CPU 32 decreases to the lowest load. An output current monitoring pin (Imon pin) of the VRM 304 is connected to the load detecting circuit 3022. The Imon pin can output an output current linear voltage (Vmon). The Vmon is in direct proportion to the output current Io (not shown) outputted by the VRM 304 to the CPU 32. For example, the Vmon is 1V when the output current Io outputted by the VRM 304 to the CPU 32 is 100A, and the Vmon is 0.6V when the output current Io outputted by the VRM 304 to the CPU 32 is 60 A.

The multi-phase VRM system 30 according to the embodiment of the invention calculates the present actual load of the CPU 32 via the current linear voltage (Vmon) detected by the load detecting circuit 3022. Then, the first switch circuit 3024 and the second switch circuit 3026 are driven to be on or off via the present actual load of the CPU 32. The first switch circuit 3024 and the second switch circuit 3026 can output the PWM2-3 signal and the PWM3-4 signal to the VRM 304, respectively. The VRM 304 can determine the number of phases used to supply power to the CPU 32 according to the PWM2-3 signal and the PWM3-4 signal.

Assuming that the CPU 32 operates at the heavy load initially, the load detecting circuit 3022 can drive the first switch circuit 3024 and the second switch circuit 3026 to be off according to the size of the detected output Vmon to allow the PWM2-3 signal and the PWM3-4 signal output by the first switch circuit 3024 and the second switch circuit 3026 are both at a first level. Then, the VRM 304 supplies power to the CPU 32 with four phases. When the load detecting circuit 3022 detects that the Vmon decreases to a first voltage, it represents that the load of the CPU 32 decreases at that moment, the load detecting circuit 3022 can drive the second switch circuit 3026 to be on. The second switch circuit 3026 which is on outputs the PWM3-4 signal having a second level to the VRM 304, and the VRM 304 supplies power to the CPU 32 with three phases instead of four-phases. When the load detecting circuit 3022 detects that the Vmon continually decreases to a second voltage, it represents that the load of the CPU 32 is lower, the load detecting circuit 3022 drives the first switch circuit 3024 to be on, the first switch circuit 3024 which is on outputs the PWM2-3 signal having the second level to the VRM 304. Since the level of the PWM2-3 signal is changed from the first level to the second level, the VRM 304 supplies power to the CPU 32 with two phases instead of three phases. When the load of the CPU 32 decreases to the lowest load, the CPU 32 transmits a PSI signal to the VRM 304, and the VRM 304 supplies power to the CPU 32 with a single phase.

Figure 4:
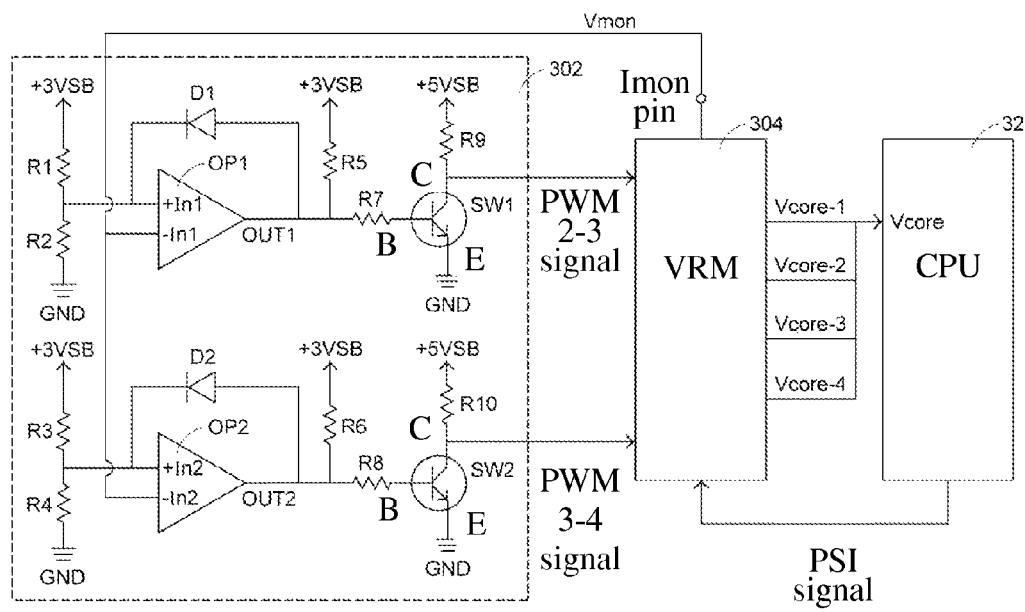
FIG. 4 is a schematic diagram showing a phase control circuit according to an embodiment of the invention.

FIG. 4 is a schematic diagram showing a phase control circuit 302 according to an embodiment of the invention. The phase control circuit 302 includes operational amplifiers OP1 and OP2, resistors R1~R10, diodes D1 and D2, and transistor switches SW1 and SW2. The positive input end +IN1 of the operational amplifier OP1 is connected to a first power source voltage +3 VSB via the resistor R1 and connected to the GND via the resistor R2. The negative input end −IN1 of the operational amplifier OP1 is used for receiving the output current linear voltage Vmon outputted by the VRM 304. The output end OUT1 of the operational amplifier OP1 is connected to the anode of the diode D1. The positive input end +IN1 of the operational amplifier OP1 is connected to the cathode of the diode D1 and connected to first power source voltage +3 VSB via the resistor R5. The base B of the transistor switch SW1 is connected to the output end OUT1 of the operational amplifier OP1 via a resistor R7. The collector C of the transistor switch SW1 is connected to a second power source voltage +5 VSB via a resistor R9, and it outputs the PWM2-3 signal to the VRM 304. The emitter E of the transistor switch SW1 is connected to the GND.

Additionally, the positive input end +IN2 of the operational amplifier OP2 is connected to the first power source voltage +3 VSB via a resistor R3 and connected to the GND via a resistor R4. The negative input end −IN2 of the operational amplifier OP2 is used for receiving the output current linear voltage Vmon outputted by the VRM 304. The output end OUT2 of the operational amplifier OP2 is connected to the anode of the diode D2. The positive input end +IN2 of the operational amplifier OP2 is connected to the cathode of the diode D1 and connected to the first power source voltage +3 VSB via a resistor R6. The base B of the transistor switch SW2 is connected to the output end OUT2 of the operational amplifier OP2 via a resistor R8. The collector C of the transistor switch SW2 is connected to the second power source voltage +5 VSB via a resistor R10, and it outputs the PWM3-4 signal to the VRM 304. The emitter E of the transistor switch SW2 is connected to the GND.

The circuit including the operational amplifiers OP1 and OP2, the resistors R1~R6, the diodes D1 and D2 is the load detecting circuit 3022 in FIG. 3. The circuit including the transistor switch SW1, resistors R7, R9 is the load detecting circuit 3024 in FIG. 3. The circuit including the transistor switch SW2, the resistors R8 and R10 is the second switch circuit 3026 in FIG. 3.

The corresponding output current linear voltage Vmon is 0.8V when the output current Io is 80 A. Since the voltage of the positive input end +IN of the operational amplifier OP1 is 0.3V (in the series connection of the resistor R1 and the resistor R2, the divided voltage of the power source voltage +3 VSB across the resistor R2 is about 0.3V), and the voltage of the negative input end –IN1 is 0.8V, the output end OUT1 outputs a low level voltage (which is set to be 0V). The 0V voltage makes the transistor switch SW1 off via the resistor R7. As a result, the PWM2-3 signal for controlling the VRM 304 to supply power with two phases or three phases is at the high level +5 VSB.

Since the voltage of the positive input end +IN2 of the operational amplifier OP2 is 0.5V (in the series connection of the resistor R3 and the resistor R4, the divided voltage of power source voltage +3 VSB across the resistor R4 is about 0.5V), and the voltage of the negative input end –IN2 is 0.8V, the output end OUT2 outputs a low level voltage (which is set to be 0V). The 0V voltage makes the transistor switch SW2 off via the resistor R8. As a result, the PWM3-4 signal for controlling the VRM 304 to supply power with three phases or four phases is also at the high level (+5 VS). The VRM 304 supplies power with four phases to the CPU 32 when (PWM2-3, PWM3-4)=(High, High).

Assuming that since the load of the CPU 32 decreases, the output current Io decreases from 80 A to be between 50 A and 30 A, such as 40 A, the corresponding core current linear voltage Vmon is 0.4V. At that moment, the PWM2-3 signal for controlling the VRM 304 to supply power with two phases or three phases is still at the high level +5 VSB. They are not described for a concise purpose. However, in the operational amplifier OP2, since the voltage of the negative input end –IN2 is lower than the voltage of the positive input end +IN2, the output end OUT2 outputs a high level voltage (which is set to be +5V). The 5V voltage makes the transistor switch SW2 on via the resistor R8. As a result, the level of the PWM3-4 signal for controlling the VRM 304 to supply power with three phases or four phases is changed to a low level (0V). The VRM 304 supplies power with three phases to the CPU 32 when (PWM2-3, PWM3-4)=(High, Low) at the moment. That is, once the output end OUT2 of the operational amplifier OP2 outputs a high level voltage when the output current Io decreases to be lower than 50 A, the phase control circuit 302 notices the VRM 304 to supply power to the CPU with three phases instead of four phases via the PWM3-4 signal.

Assuming that since the load of the CPU 32 decreases continuously, the output current Io decreases continuously from 40 A to be between 15 A and 30 A, such as 20 A, the corresponding output current linear voltage (Vmon) is 0.2V. At that moment, the PWM3-4 signal for controlling the VRM 304 to supply power with three phases or four phases is still at the low level (0V). They are not described for a concise purpose. However, in the operational amplifier OP1, since the voltage of the positive input end +IN1 is higher than the voltage of the negative input end –IN1, the output end OUT1 outputs a high level voltage (which is set to be +5V). The 5V voltage makes the transistor switch SW1 on via the resistor R7. As a result, the PWM2-3 signal for controlling the VRM 304 to supply power with two phases or the three phases is also at the low level (0V). The VRM 304 supplies power with two phases to the CPU 32 when (PWM2-3, PWM3-4)=(Low, Low). That is, the output end OUT1 of the operational amplifier OP1 outputs a high level voltage when the core current of the CPU decreases to be lower than 30 A, and the phase control circuit 302 notices the VRM 304 to supply to the CPU with two phases instead of three phases via the PWM2-3 signal.

Assuming that the load of the CPU 32 continuously decreases to the lowest load, that is, the output current Io decreases from 20 A to 15 A, the CPU 32 transmits a PSI signal to the VRM 304, and the VRM 304 supplies power to the CPU 32 with a single phase. That is, once the CPU 32 outputs the PSI signal to the VRM 304, the VRM 304 supplies power with single phase instead of two phases to the CPU.

As stated above, in the process of the decrease of the output current Io from current close to full load (such as 100 A) to current lower than 15 A, (PWM2-3, PWM3-4)=(High, High) when the output current Io is higher than 50 A, and the VRM 304 supplies power to the CPU32 with four phases. (PWM2-3, PWM3-4)=(High, Low) when the output current Io decreases to be between 50 A and 30 A, the VRM 304 supply power to the CPU 32 with three phases. (PWM2-3, PWM3-4)=(Low, Low) when the output current Io decreases to be between 30 A and 15 A, the VRM 304 supplies power to the CPU 32 with two phases. After the output current (Io) decreases to 15 A, the VRM 304 supplies power to the CPU 32 with a single phase due to the appearance of the PSI signal.

Consequently, via the phase control circuit 302, the VRM 304 can switch between the four-phase power supply and the three phase power supply, the three phase power supply and the two phase power supply, and the two phase power supply and the single phase power supply according to the actual load of the CPU 32. As a result, it improves the conventional four-phase VRM which can only switch between the four phase power supply and the single phase power supply.

Additionally, the VRM 304 switches between the three-phase power supply and the four-phase power supply repeatedly when the output current Io varies near the 50 A, which may cause energy loss. To avoid this situation, the load detecting circuit 3022 according to the invention includes a voltage delay effect. As shown in FIG. 4, the moment the output current Io decreases from current higher than 50 A to current lower than 50 A, that is the moment the corresponding output current linear voltage (Vmon) decreases from a voltage higher than 0.5V to a voltage lower than 0.5V, the high level voltage (+5V) outputted by the output end OUT2 of the operational amplifier OP2 conducts the conduct diode D2 at the same time, and the resistor R3 and the resistor R6 generate a parallel connection effect (the first ends of the resistor R3 and the resistor R6 are connected via the conducted diode D2, the second ends of the resistor R3 and the resistor R6 are both connected to the power source voltage (+3 VSB)). As a result, the voltage of the positive input end (+IN2) of the operational amplifier OP2 increases from 0.5V to 0.6V momently (in the connection configuration that the resistor R3 is firstly parallelly connected to the resistor R6, and then serially connected to the resistor R4, the divided voltage of +3 VSB across the resistor R4 is near 0.6V.) Consequently, once the output current Io decreases to current lower than 50A, which causes the VRM (VRM) 304 supplies power to the CPU 32 with three phases instead of four phases, the output current Io should increase to current at least 60 A to enable the output end OUT2 of the operational amplifier OP2 to output a low level voltage (0V) to cut off the transistor switch SW2. Then the PWM3-4 signal returns to the high level (+5V) to enable the VRM 304 to supply power to the CPU 32 with four phases again.

Figure 5A:
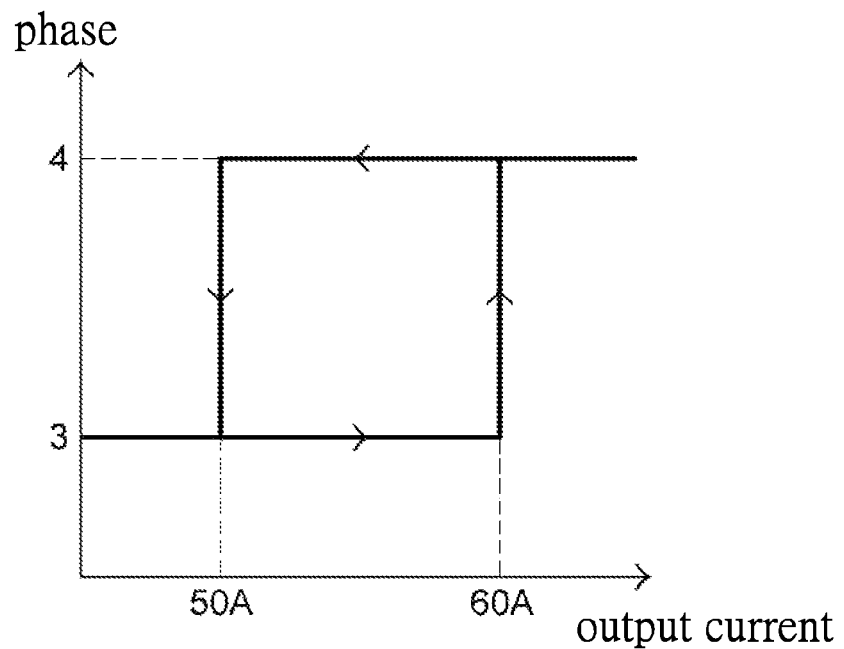
FIG. 5A and FIG. 5B are schematic diagrams showing voltage delay effects of a load detecting circuit according to an embodiment of the invention.

FIG. 5A is a schematic diagram showing a voltage delay effect of a load detecting circuit 3022 according to an embodiment of the invention. Firstly, the VRM 304 supplies power to the CPU 32 with four phases before the output current Io decreases to 50 A. The VRM 304 supplies power to the CPU 32 with three phases after the output current Io decreases to 50 A. The VRM 304 still supplies power to the CPU 32 with three phases when the output current Io returns to 50 A again. The VRM 304 supplies power to the CPU32 with four phases only after the output current Io returns to 60 A. As a result, via the voltage delay effect of the load detecting circuit 3022, it can avoid that the VRM 304 switches between the three phase power supply and the four phase power supply repeatedly since the output current Io drifts at the critical point 50 A.

Similarly, the voltage delay effect of the load detecting circuit 3022 according to the invention can avoid that the VRM 304 switches between the two phase power supply and the three phase power supply due to the drift of the output current Io at the critical point 30 A. As shown in FIG. 4, the moment the output current Io decreases from current higher than 30 A to current lower than 30 A, that is the moment the corresponding output current linear voltage (Vmon) decreases from a voltage higher than 0.3V to a voltage lower than 0.3V, the high level voltage (+5V) outputted by the output end OUT1 of the operational amplifier OP1 conducts the conduct diode D1 at the same time, and the resistor R1 and the resistor R5 generate a parallel connection effect (the first ends of the resistor R1 and the resistor R5 are connected via the conducted diode D1, the second ends of the resistor R1 and the resistor R5 are both connected to the power source voltage (+3 VSB)). As a result, the voltage of the positive input end (+IN2) of the operational amplifier OP2 increases from 0.3V to 0.4V at that instant (in the connection configuration that the resistor R1 is firstly serially connected to the resistor R5, and then parallelly connected to the resistor R2, the divided voltage of +3 VSB across the resistor R2 is near 0.4V). Consequently, once the output current Io decreases to current lower than 30 A to make the VRM (VRM) 304 supply power to the CPU 32 with two phases instead of three phases, the output current Io must increase to at least 40 A to enable the output end OUT1 of the operational amplifier OP1 to output a low level voltage (0V) to cut off the transistor switch SW1, and the PWM2-3 signal returns to the high level (+5V) to enable the VRM 304 supply power to the CPU 32 with three phases.

Figure 5B:
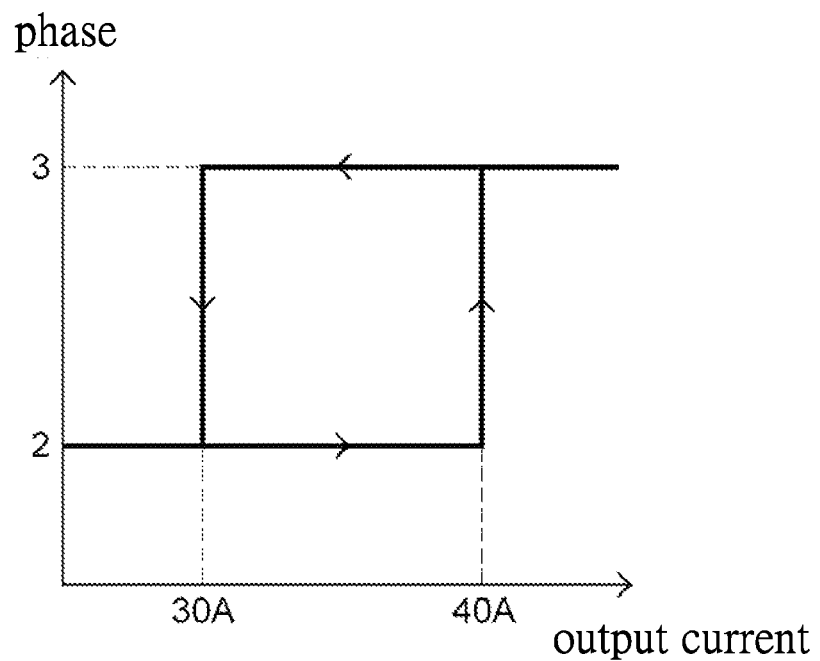

FIG. 5B is a schematic diagram showing a voltage delay effect of a load detecting circuit 3022 according to an embodiment of the invention. Firstly, the VRM 304 supplies power to the CPU32 with three phases before the output current Io decreases to 30 A. The VRM 304 supplies power to the CPU 32 with two phases after the output current Io decreases to 30 A. The VRM 304 still supplies power to the CPU 32 with two phases when the output current Io returns to 30 A. The VRM 304 supplies three-phase to the CPU 32 only after the output current Io returns to 40 A. As a result, it can avoid that the VRM 304 switches between the three phase power supply and the two phase power supply repeatedly due to the drift of the output current Io at the critical point 30 A.

Similarly, in the process of the increase of the output current Io from current lower than 15 A to current close to full load (100 A), before the output current Io increases to 15 A, due to the appearance of the PSI signal, the VRM 304 supplies power to the CPU 32 with a single phase. When the output current Io increases to current higher than 15 A but lower than 40 A, since (PWM2-3, PWM3-4)=(L, L) and the PSI signal disappears, the VRM 304 supplies power to the CPU 32 with two phases. When the output current Io increases to current higher than 40 A but lower than 60 A, since (PWM2-3, PWM3-4)=(H, L), the VRM 304 supplies power to the CPU 32 with three phases. When the output current Io increases to current higher than 60 A, since (PWM2-3, PWM3-4)=(H, H), the VRM 304 supplies power to the CPU32 with four phases.

Consequently, the conventional voltage regulator can only switch between the four phase power supply and the single phase power supply according to the PSI signal. The phase control circuit 302 according to the invention can enable the VRM 304 to switch between the single phase and the two phases, the two phases and the three phases, the three phases and the four phases according to the actual load of the CPU 32. Additionally, via the voltage delay effect of the phase control circuit 302, it can avoid that the VRM 304 repeatedly switches between the two phase power supply and the three phase power supply or the three phase power supply and the four phase power supply due to the drift of the output current Io at critical points.

The four phase VRM is taken as an example of the invention, and the invention is not limited thereto. The multi-phase VRM with any phase can switch between different phases according to the features of the invention.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A multi-phase voltage regulator module (VRM) system, used in a CPU, comprising:
   a VRM connected to the CPU, wherein the VRM outputs a load detecting voltage, and the load detecting voltage is in direct proportion to an actual load of the CPU; and
   a phase control circuit connected to the VRM, comprising:
      a first switch circuit, coupled to the VRM;
      a second switch circuit, coupled to the VRM; and
      a load detecting circuit, coupled to the first switch circuit, the second switch circuit and the VRM, wherein the load detecting circuit receives the load detecting voltage from the VRM, and a voltage delay effect is applied by the phase control circuit,
   wherein the multi-phase VRM system outputs a core voltage having different phases to the CPU according to the actual load, the phase control circuit outputs a first level phase switching signal to the VRM when the load detecting voltage increases to a first voltage, and the core voltage outputted by the VRM to the CPU is changed from N phases to M phases after the VRM receives the first level phase switching signal; the phase control circuit outputs a second level phase switching signal to the VRM when the load detecting voltage decreases to a second voltage, and the core voltage outputted by the VRM to the CPU is changed from M phases to N phases after the VRM receives the second level phase switching signal, such that a change of the core voltage is delayed by the load detecting circuit in response to the actual load, the first voltage is higher than the second voltage, and M is larger than N.

2. The multi-phase VRM system according to claim 1, wherein the CPU transmits a power status indicator signal to the VRM when the actual load decreases to a minimum load value, and the core voltage outputted by the VRM to the CPU is changed to a single phase.

3. The multi-phase VRM system according to claim 2, wherein when the load increases to the minimum load value and the CPU stops transmitting the power status indicator signal to the VRM, the core voltage outputted by the VRM to the CPU is changed from the single phase to two phases.

4. The multi-phase VRM system according to claim 1, wherein the load detecting voltage is outputted by an output current monitoring pin of the VRM, and the load detecting voltage is in direct proportion to an output current outputted by the VRM to the CPU.

5. The multi-phase VRM system according to claim 1, wherein N is not smaller than two.

6. A method of providing a core voltage to a CPU, used in a Voltage regulator module (VRM) system, comprising:
   detecting an actual load of the CPU; and
   changing the core voltage outputted by the VRM to the CPU from N phases to M phases when the actual load of the CPU increases to a first load value, and changing the core voltage outputted by the VRM to the CPU from M phases to N phases when the actual load of the CPU decreases to a second load value,
   wherein a voltage delay effect is applied in the method, when changing the core voltage from N phases to M phases or changing the core voltage from M phases to N phases, a change of the core voltage is delayed in response to the actual load,
   wherein M is larger than N, and the first load value is larger than the second load value.

7. The method of providing the core voltage to the CPU according to claim 6, further comprising:
   changing the core voltage outputted by the VRM to the CPU from two phases to a single phase when the load of the CPU decreases to a minimum load value; and
   changing the core voltage outputted by the VRM to the CPU from the single phase to two phases when the load of the CPU increases to the minimum load value,
   wherein the minimum load value is smaller than the second load value.

* * * * *